(12) United States Patent
Socransky

(10) Patent No.: US 12,463,348 B2
(45) Date of Patent: *Nov. 4, 2025

(54) SYSTEM AND METHOD FOR INFUSING NANO-TECHNOLOGY INTO PRODUCTION OF PATCH ANTENNAS FOR ARRAY AND POLYMERS AND BIOLOGICAL AND ARTIFICIAL MEMBRANED MATERIAL

(71) Applicant: Alexander Socransky, Los Angeles, CA (US)

(72) Inventor: Alexander Socransky, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,025

(22) Filed: May 6, 2024

(65) Prior Publication Data

US 2025/0015509 A1 Jan. 9, 2025

Related U.S. Application Data

(60) Continuation of application No. 18/138,018, filed on Apr. 21, 2023, now Pat. No. 12,009,593, which is a
(Continued)

(51) Int. Cl.
*H01Q 15/14* (2006.01)
*B29B 7/90* (2006.01)
(Continued)

(52) U.S. Cl.
CPC ............. *H01Q 15/141* (2013.01); *B29B 7/90* (2013.01); *B29C 41/003* (2013.01); *B29C 41/08* (2013.01); *B29C 41/12* (2013.01); *B29D 11/0074* (2013.01); *C08J 3/203* (2013.01); *C08K 3/04* (2013.01); *C08K 3/041* (2017.05); *C08K 3/046* (2017.05); *C08K 7/06* (2013.01); *H01Q 15/16* (2013.01); *B29K 2105/167* (2013.01); *B29K 2507/04* (2013.01); *B29L 2011/0083* (2013.01); *B29L 2031/3067* (2013.01); *B29L 2031/3076* (2013.01); *B29L 2031/3097* (2013.01);
(Continued)

(58) Field of Classification Search
CPC ........ H01Q 15/141; H01Q 15/16; B29B 7/90; B29D 11/0074; C08K 3/04; C08K 3/041; C08K 3/046; C08K 7/06; C08K 2201/001; C08K 2201/011; C08K 2201/014; B29K 2105/167; B29K 2507/04; B29L 2011/0083; B29L 2031/3067; B29L 2031/3076; B29L 2031/3097; C08J 3/203
See application file for complete search history.

(56) References Cited

U.S. PATENT DOCUMENTS 12,003,593 B2 * 6/2024 Yudowitch ............ H04L 41/145

* cited by examiner

*Primary Examiner* — Abbas Rashid
*Assistant Examiner* — Elisa H Vera
(74) *Attorney, Agent, or Firm* — Olivo IP Law Group, P.C.; John W. Olivo, Jr.

(57) ABSTRACT

The present invention introduces the use of a carbon nanotube-based material in the production of phased array patch antennas of various shapes and sizes including slot and spiral patch antennas. The use of this material provides the ability for the antennas to withstand high-intensity shock vibrations and other intense disturbances and continue emitting phased array signals. Furthermore, the use of this material for patch antennas allows for the alteration of the desired frequency and directional degree of interest by simply energizing various elements within the carbon nanotube-based material.

19 Claims, 12 Drawing Sheets

Spiral Antenna

Related U.S. Application Data continuation-in-part of application No. 17/572,061, filed on Jan. 10, 2022, now Pat. No. 11,848,495, which is a continuation of application No. 17/180,476, filed on Feb. 19, 2021, now Pat. No. 11,258,183, which is a division of application No. 16/588,668, filed on Sep. 30, 2019, now Pat. No. 11,600,929.

(51) Int. Cl.
| | |
|---|---|
| *B29C 41/00* | (2006.01) |
| *B29C 41/08* | (2006.01) |
| *B29C 41/12* | (2006.01) |
| *B29D 11/00* | (2006.01) |
| *B29K 105/16* | (2006.01) |
| *B29K 507/04* | (2006.01) |
| *B29L 11/00* | (2006.01) |
| *B29L 31/30* | (2006.01) |
| *C08J 3/20* | (2006.01) |
| *C08K 3/04* | (2006.01) |
| *C08K 7/06* | (2006.01) |
| *H01Q 15/16* | (2006.01) |

(52) U.S. Cl.
CPC .. *C08K 2201/001* (2013.01); *C08K 2201/011* (2013.01); *C08K 2201/014* (2013.01)

Spiral Antenna

ARMCHAIR CHIRALITY

ZIGZAG CHIRALITY

SYSTEM AND METHOD FOR INFUSING NANO-TECHNOLOGY INTO PRODUCTION OF PATCH ANTENNAS FOR ARRAY AND POLYMERS AND BIOLOGICAL AND ARTIFICIAL MEMBRANED MATERIAL

CROSS REFERENCE TO RELATED APPLICATIONS

This application is a continuation of U.S. patent application Ser. No. 18/138,018, filed Apr. 21, 2023, which is a continuation in part of U.S. patent application Ser. No. 17/572,061, filed Jan. 10, 2022, and issued as U.S. Pat. No. 11,848,495 on Dec. 19, 2023, which is a continuation of U.S. patent application Ser. No. 17/180,476, filed Feb. 19, 2021, and issued as U.S. Pat. No. 11,258,183 on Feb. 22, 2022, which is a divisional of U.S. patent application Ser. No. 16/588,668, filed Sep. 30, 2019, and issued as U.S. Pat. No. 11,600,929 on Mar. 7, 2023, the contents of which are incorporated herein by reference.

BACKGROUND OF THE INVENTION

The present invention is directed to the production of phased array antennas or reflecting or absorbing shapes from a carbon nanotube-based fiber material with the potential application of other, non-carbon, nano-based materials containing various structures. Current materials used for phased array patch, spiral, and slot antennas lack the ability to withstand high-intensity shock vibrations and other disturbances, making their use less practical for various applications in which they can be expected to withstand intense disturbances such as in combat as well as other applications.

The present invention introduces the use of a carbon nanotube-based fiber material in the production of multiple antenna designs such as phased array patch antennas of various shapes and sizes including slot and spiral patch antennas. The use of this material provides the ability for the antennas to withstand high-intensity shock vibrations and other intense disturbances. Furthermore, the design of the material could be changed for patch antennas to allow for the alteration of the desired frequency and directional degree of interest by simply using the resonant-frequency-spring-damping model to move various elements within the carbon nanotube-based material at the time of manufacturing or even post-manufacturing. It is also possible to only energize certain nanoparticles within the material and/or product post-production (depending on the design and the materials used) as long as the nanoparticles are smaller than the membrane and the binding material. This allows adaptive changes to be made to the product on the fly. The present invention provides the novel ability to build an antenna on a nano scale as well as use carbon nano material for a patch antenna or other types of antennas.

SUMMARY OF THE INVENTION

The present invention pertains to a system and method for the development and application of nano technology in the production of patch or other antennas for array and other uses. In the primary embodiment of the present invention, the use of materials such as carbon nanotubes, nanoparticles, carbon nanofibers, and graphene/graphite powders can be used to develop a slurry that can be applied in the production of patch antennas or other shapes for antenna, as well as other artificial or biological membraned materials. In one embodiment of the present invention, the slurry can be used in the development of phased array patch antennas. In this embodiment, the production process begins with carbon or other nano-based material. The nano-resonated structure is built into the nano matrix, to be used in the production of any of the phased array antenna (for example but not by way of limitation, slot antenna, patch antenna, spiral antenna).

The present invention provides an alternative to the current preferred material (metal) for the development of antennas and other devices. Instead of using metal, which is the currently preferred material used in the development of antennas, one would use reflective carbon nanotube fiber to resonate with a typical phased array, electronically steerable antenna. Unlike metal, which is easily disturbed by various environmental shocks and doesn't contain enough impact protection or elongation, the carbon nanotube-based fiber material can withstand intense shock and continue emitting signals uninterrupted by environmental disruption.

The present invention also has reflective antenna elements that would be more suitable for shock and impact resistance due to the very nature of the impact resistance, and it would be almost as reflective as metal if not the same. The use of carbon nanotubes in the material of the antenna allows for adjustments to be made to the antenna on a molecular level. By resonating different nanotubes within the material at the same time or alternating times in different zones of the material, the purpose of the present invention can be physically altered, making the product more dynamic and able to adapt to various design requirements for each antenna in pre- or post-production.

In accordance with the preferred embodiment, the material used for the antenna or other device is created by blending carbon nanotubes, carbon nanofiber, and a resin hardener such as epoxy under suitable conditions in order to form a slurry which can be applied to a forming surface with a resin transfer mold process or other process capable of setting the slurry with equal density throughout the material and hardened in sheets from which the shape and design can be cut, punched, or removed from the material. After the production of the carbon nanotube material is complete, the antenna shape can be cut out of the conductive material in a cookie-cutter fashion, which can then also have a back layer built as a nonconductive epoxy or an electromagnetic (EM) absorbing matrix. The EM absorbing matrix would be able to minimize distortion in the surrounding zones, and potentially provide improved side lobe propagation. Then, more layers of either the same or regular carbon matrix which would help with impact resistance and elongation for very tough applications and can be included around the edges of the antenna as an insulator.

In one embodiment of the present invention, reflective, absorbing, or other design-specific nano structures can be created in varying shapes and sizes within the membrane structure by manipulating the nano particles. Using electromagnetic waves, ultrasonics, or taking into account atomic electrostatic repulsion or attraction, a strong gravitational field to help with placement and/or interaction principles for the design parameters in biomedical or other fields, or other methods, these nano particles can be oscillated into various forms depending on the desired design. For example, this method could be used in the development of feed horns or other parabolic or hyperbolic structures or patch antenna, microfluidic chambers, biomedical devices such as wearable sensors, or any shape that could be used for reflecting, absorbing or discharging. The application of nano particle technology combined with electromagnetic waves goes beyond that of antenna development and can even be used for medical purposes. Nano particles have the ability to transport medications in vivo to locations where illness, disease, or other ailments are affecting someone. This technology can also be used for RNA modification and cell organization for creating organisms, among other things. Furthermore, the present invention can be used for biological and/or nano self-assembly and third-, fourth-, and fifth-dimension programming and printing.

In the forming process of the present invention, the forming member of the present invention can be used as the bottom of the structure. Alternatively, reverse electromagnetic waves or ultrasonics can be used to keep the particles at a desired location while the formed exterior shape is hardening. Once the desired shape is formed (whether it's paraboloid, hyperboloid, or another desired shape) it can be used to have multiple look angles in the same structure or for varying design parameters other uses of electromagnetic or ultrasonic architecture could be used.

In one embodiment of the present invention, the antenna can be designed to contain one part which is able to receive a signal and another part that acts as the patch antenna. The present invention provides the potential for the antenna to absorb signals or desired wavelengths while still allowing a certain amount of signal or desired wavelengths to bypass. The present invention can also curve around certain angles to receive signals or desired wavelengths without giving off a radar signature. The materials presented for the present invention can also be used to create an antenna like a parabolic or hyperbolic that can receive with greater efficiency but still be used to track Low Earth Orbit ("LEO") and/or Medium Earth Orbit ("MEO") and lock onto multiple orbit satellites at the same time due to the ability to have an offset dish mixed with multiple offset feed-horns around the structure. Just as a telescope uses curved mirrors to gather light, the present invention has the ability to use curved nanoparticles in order to gather higher gain and beam it back to the transceiver. This can also be used for optical technology depending on the size of the nanoparticles.

The present invention has the ability to capture the entire sky from one device with multiple bands by using various sizes of nanoparticles that reflect various frequencies in order to suspend them in the epoxy, elastomer, or other binding material accordingly. Using different frequencies at staggered times while the binding material is setting ensures adjustment to placement of those nanoparticles in membrane that it is designed for. The desired length of the radio or other waves corresponds to the nanoparticle size, therefore having the ability to adjust the location and size of nanoparticles used in the present invention to provide more efficiency when sending unique communication wave lengths. Many larger nanomolecular structures could potentially have gaps within their membrane which could be filled with smaller nanomolecular particles to get higher frequencies in the smaller design place. Furthermore, doping of the nanoparticles can be specific to different areas, producing a material that is absorbent in some areas and reflective and in others at the same time.

In an alternative embodiment, the structure of the present invention could be constructed with a wire protruding from the back of the dish to create a charged shape of nanoparticles that could either reflect or absorb depending on the size and length of the design. This could also be shaped within the matrix to extend on another dimension in order to have it charge or discharge.

In one embodiment of the present invention, a membraned material such as carbon fiber, Kevlar, fiberglass, or other textile material is produced wherein nanomaterials are fused into the bonding materials and used to make these materials conductive or more dielectric in nature. Various built applications can be achieved by altering the material on a molecular or nanoscale level with the nanomaterials created. These alterations can be achieved via ultrasound, microwaves, or other methods capable of organizing the nanomaterials into place to create the structure within a membrane that can aggregate or interact with nearby particles or other mini structures in the membrane. Resonating these molecules or nanoparticles can create a meta-like material or other interactions within the nano-molecular structure.

Changing the doping and nano particles within the structure of the material can make the material more insulating, more absorbing, or more conductive by tuning the electric and thermoelectric, quantum interactions or atomic properties of the nanoparticles to create a desired effect. This tuning process is also referred to as doping the nanoparticles. Doping allows the material to be used as a modulator or conductive element, depending on the ionization factor or other molecular elements. The exact size of the nanoparticles or nanomaterials will change how the material responds to different wavelengths.

The present invention provides a method for producing a material such as carbon fiber or fiberglass that is more dielectric in form with the ability to be conductive. Dielectric material has the ability to transmit electric force without conducting or insulating, therefore the ability of the present method to develop a material that may be both dielectric and conductive is truly novel. The present invention takes certain nanoparticles in a material with placement in different regions in four dimensions. These nanoparticles can be specifically placed within the material by design and can be conductive throughout the entire material. The size of the nanoparticles used determines the resonant frequency of the material. Changing the resonance with electromagnetics, ultrasonics or photonics can change the desired structure in such a way that the material becomes a programable designed material that can interact with other elements at an atomic level or nano particles to make a true meta-material. The present invention is also novel in that it provides a method for using carbon fiber as a resonator or reflector and as a conductive piece of material. A resonator patch antenna is much more efficient for creating a phased array. The present invention conducts waves by resonating the material. This gives the material versatility, for example the material could be used to create a feed horn.

The material can be altered to absorb or reflect waves based on the size of the nanoparticles used. For example, and not by way of limitation, small nanoparticles in correlation to the wavelength embedded in the material would allow the material to reflect waves, whereas larger nanoparticles in correlation to the wavelength would cause the material to absorb the waves. Tuning the size of the nanoparticles changes the absorbent and reflective properties of the material, making it truly versatile. In this way, the present invention can be used beyond antennas, and can be implemented in biomedical technology for ionization, RNA encoding, and cell programming. When it comes to creating a patch antenna from this material, it can be made in such a way that it is functionalized to be conductive in nature dependent on the other design parameter.

When using a binder that hardens quickly, the larger nanoparticles should be placed within the material before the smaller nanoparticles, so that the smaller nanoparticles may fill the gaps left by the larger nanoparticles. Higher wavelengths move smaller nanoparticles and need less wattage output compared to larger wavelengths which move the larger nanoparticles. This difference can be used to place the nanoparticles according to size in order to create a material that is unique to the specific design in terms of absorbance, reflectivity, and other design-specific aspects. With a Newtonian fluid, this dynamic could be changed due to the ability to change the fluid's consistency which makes the movement of the nanoparticles slower or faster. One could even change the viscosity of the membraned material with a Newtonian bonding material, thus changing the conductivity using different doping structures within the bonding material and moving differently sized nanoparticles within the structure of the material. This could be achieved by modifying the bonding to a level that is specific to the size of the nanoparticles in order to only change the placement of the small or larger particles, respectively. In this way, one could also create various levels of conductivity, reflecting or absorbing and/or a change of atomic precursor to relate to other various atomic interactions within the material by doping up certain functionalized agents, creating a "meta material."

The design methods of the present invention could be used to manufacture various electronic devices with the ability to manufacture in the fifth dimension ("5D") world using multiple angles of electromagnetics or other methods which resonate the nanoparticles. These methods are not limited to the development of phased arrays, antennas, and other electronics. In fact, the methods used in the present invention can be applied to biological purposes and medical devices, for example, the development of self-assembly nanoparticles can be used to move or change particles targeted to specific illnesses or for RNA modification. These methods can also be applied on a biological and chemical level to change the forms of various proteins and ionic structures in the process of constructing organisms.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE PREFERRED EMBODIMENT

Figure 1:
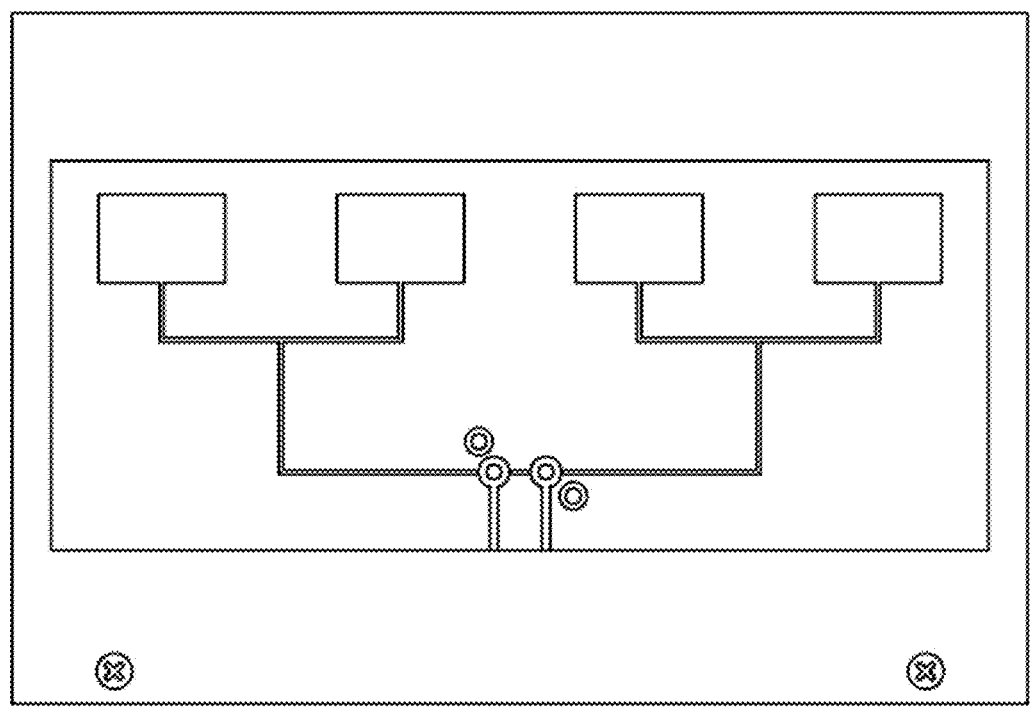
FIG. 1 is 1 is an image of four patch antennas.

FIG. 1 is an image of four patch antennas 100. In accordance with the preferred embodiment, carbon-resonated nanotube material is used to develop patch antennas such as those in FIG. 1 which act as phased array antennas.

Figure 2:
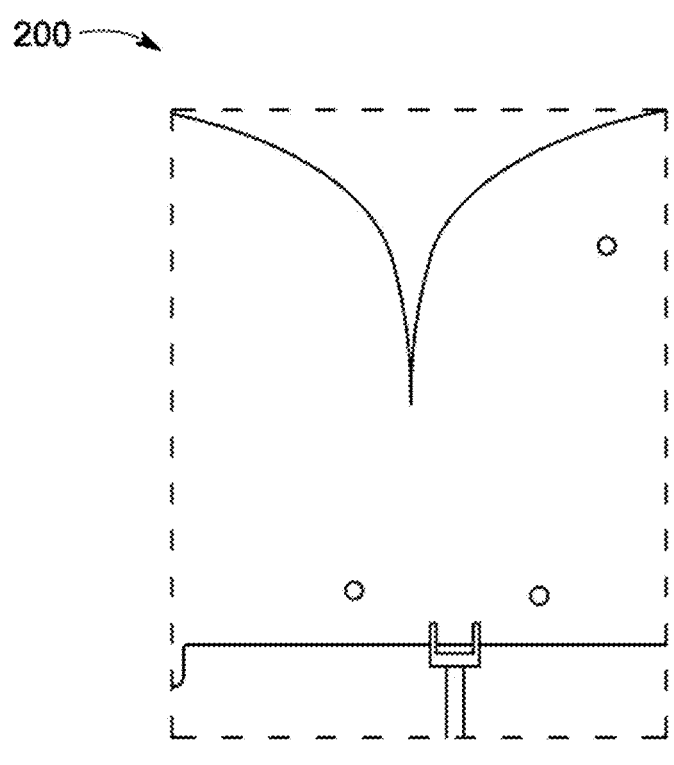
FIG. 2 is an image of a slot antenna.

FIG. 2 is an image of a slot antenna 200. In accordance with the preferred embodiment, the material used to construct the antennas can be used to construct several different forms of antennas, one of which may be slot antennas.

Figure 3:
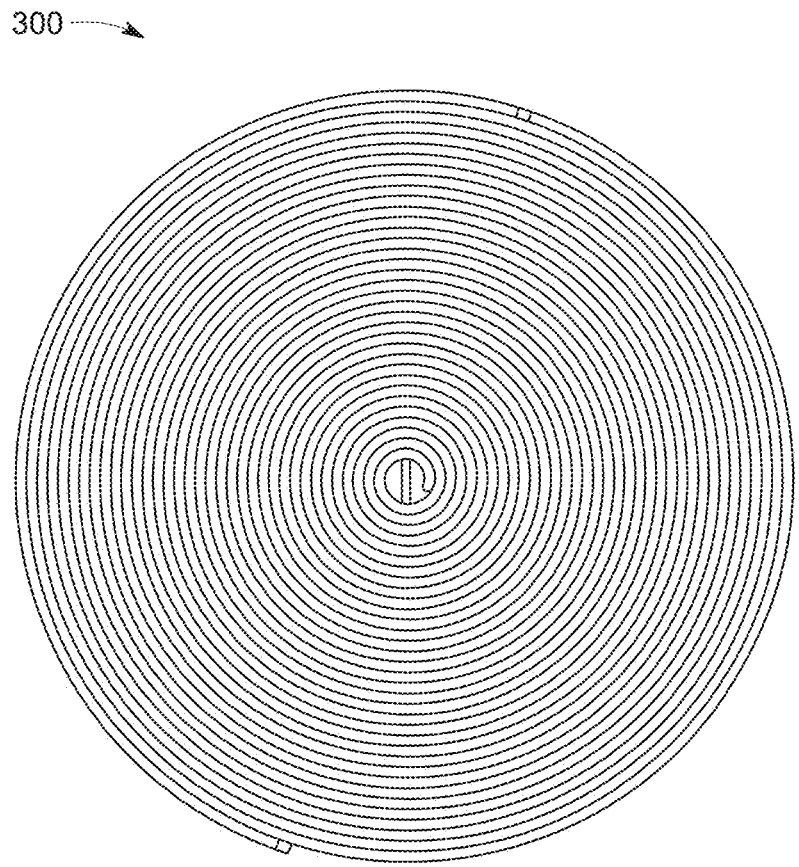
FIG. 3 is an image of a spiral antenna.

FIG. 3 is an image of a slot antenna 300. In accordance with the preferred embodiment, the material used to construct the antennas can be used to construct several different forms of antennas, one of which may be spiral antennas.

Figure 4A:
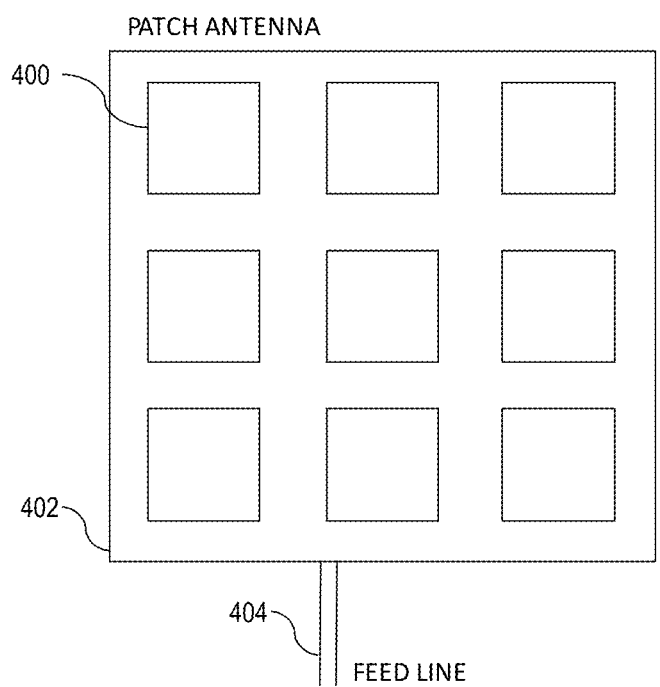
FIG. 4a is a diagram of an example of patch antennas.

FIG. 4a is a diagram of patch antennas. In accordance with the preferred embodiment, patch antennas 400 (which may be patches, slots, spirals, or other shapes) are placed on a conductive surface 402 with a feed line 404 providing each antenna with resonance.

Figure 4B:
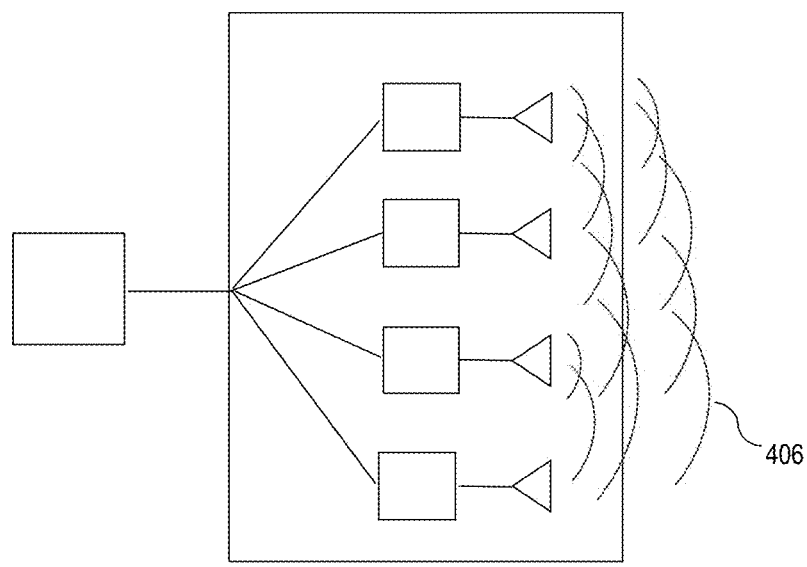
FIG. 4b is a diagram showing the phased array signal pattern of the patch antennas.

FIG. 4b is a diagram displaying the emitted signals from the patch antennas. In accordance with the preferred embodiment, the patch antennas emit signals 406 in a phased array. Once emitted, the waves interact constructively and destructively, allowing the signal to be aimed in a specific direction. This allows for the signal to be projected in a specific direction as opposed to a general area.

Figure 4C:
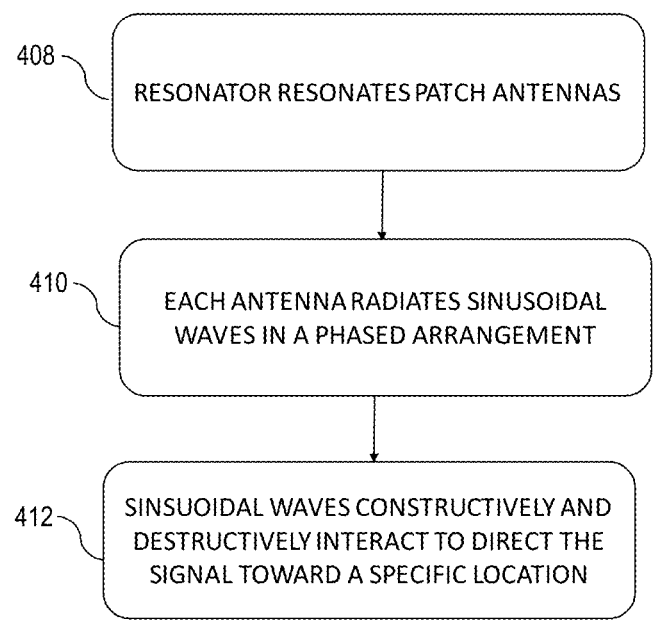
FIG. 4c is a flow diagram outlining the way in which the patch antenna's function.

FIG. 4c is a flow diagram outlining the function of the patch antennas and their resonator. In accordance with the preferred embodiment, a resonator resonates the patch antennas 408. Then, each antenna radiates sinusoidal waves in a phased arrangement 410 as shown in FIG. 4b. Next, the emitted sinusoidal waves constructively and destructively interact to direct the signal toward a specific location 412.

Figure 5:
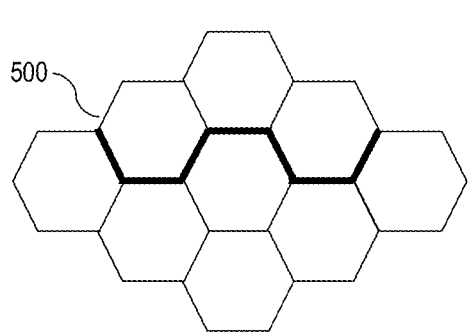
FIG. 5 is a diagram comparing the different chiral structures of the carbon nanotubes used.
Figure 5:
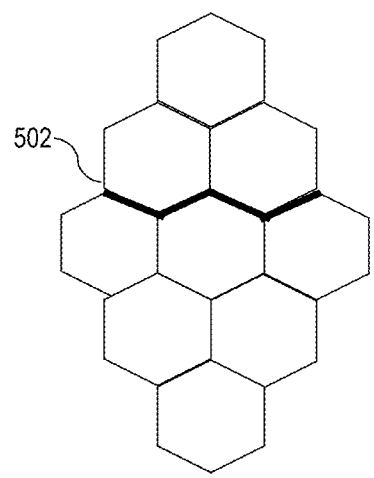

FIG. 5 is a diagram comparing the two chiral arrangements of the carbon nanotube structures in the chiral vector of the graphene layers of the material. The graphene layers of the material used for the antennas determine the electrical properties of the nanotubes. Chirality describes the angle of the nanotube's hexagonal carbon-atom lattice. These nanotubes can be in one of two chiral positions: armchair or zigzag. Accordingly, armchair nanotubes 500 have identical chiral indices and are highly desired for their conductivity. This is unlike the zigzag nanotubes 502, which may act as semiconductors. Turning a sheet of graphene as little as thirty degrees can change the nanotube it forms from armchair to zigzag chirality and vice versa.

Figure 6:
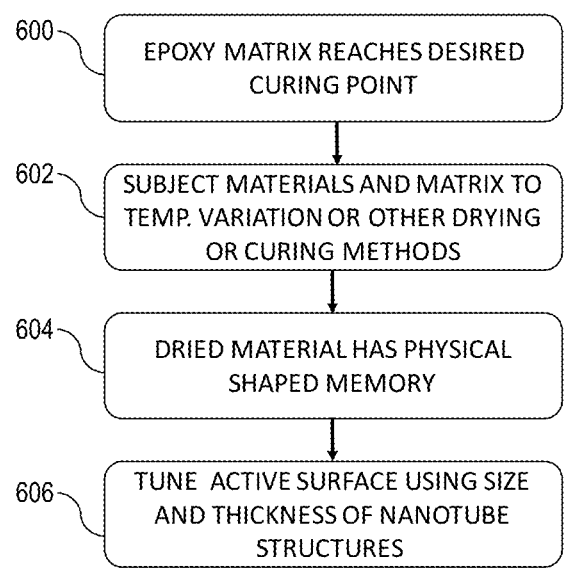
FIG. 6 is a flow diagram outlining the development of the material used.

FIG. 6 is a flow diagram outlining several steps of the development of the material used for the antennas. In accordance with the preferred embodiment, an epoxy matrix reaches the desired curing point 600. Once the desired curing point is reached, materials and matrix are subjected to a specific temperature for drying or other methods for drying or curing the material and matrix 602. Next, the dried material has physically shaped memory 604, and the active surface can be tuned using size and thickness of the nanotube structures 606.

Figure 7:
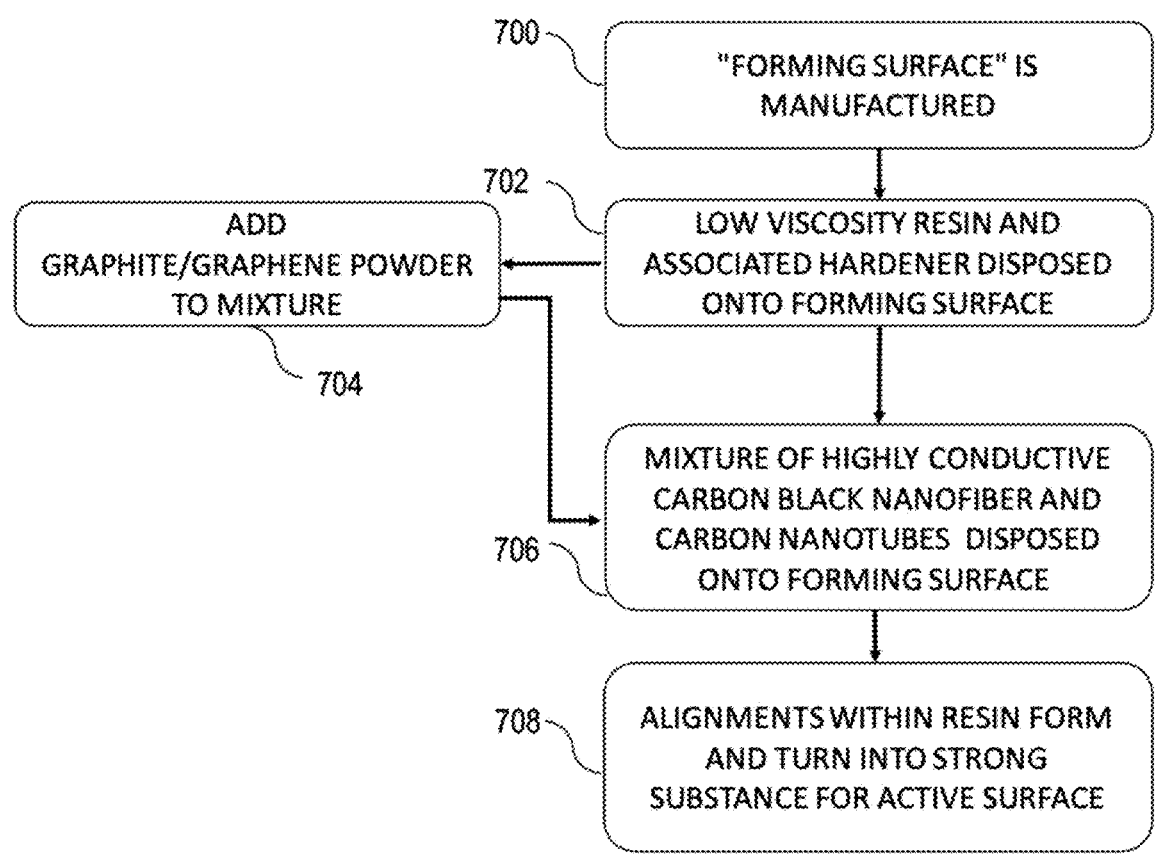
FIG. 7 is a flow diagram outlining the formation of the material used.

FIG. 7 is a flow diagram outlining the formation of the material used. In accordance with the preferred embodiment, a forming surface 700 is manufactured and used. Low viscosity resin and associated hardener is disposed onto the manufactured forming surface 702. At this point, the process can proceed to the next step, or an additional step of adding graphite/graphene powder to the mixture 704 can be inserted before the next step. After this, the mixture of highly conductive carbon black nanofiber and carbon nanotubes are disposed onto the forming surface 706. Finally, this mixture forms alignments with the resin and the product is a strong substance to be built into an active surface for the antennas 708.

Figure 8:
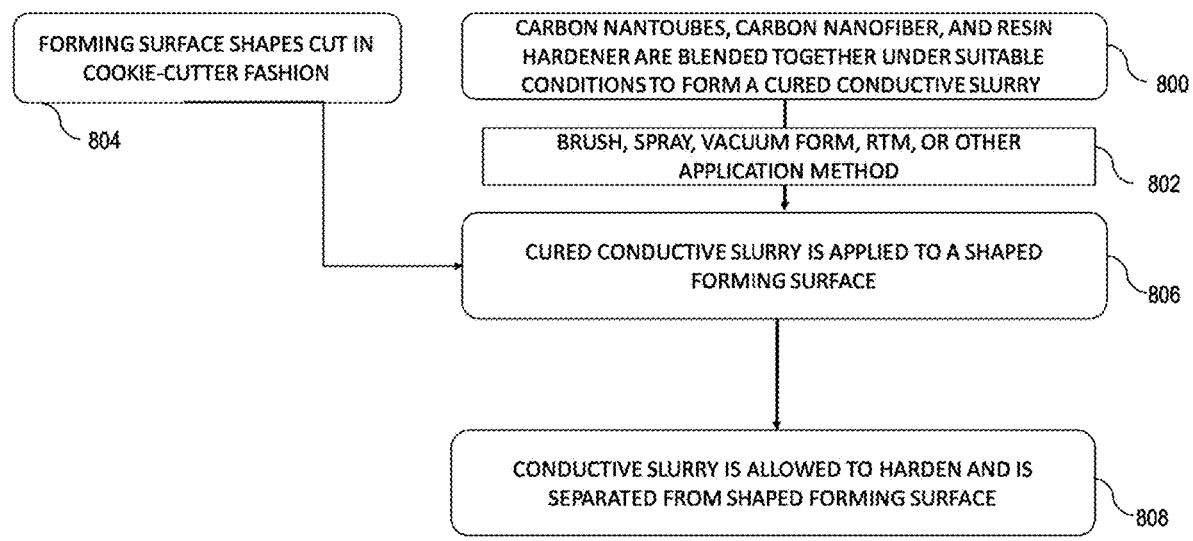
FIG. 8 is a flow diagram outlining the shaping of the material used.

FIG. 8 is a flow diagram outlining the shaping of the material used. In accordance with the preferred embodiment, carbon nanotubes, carbon nanofiber, and resin hardener are blended together under suitable conditions in order to form a cured conductive slurry 800. This slurry can then be applied via brush, spray, vacuum form, RTM, or other application methods 802. This cured conductive slurry is then placed on a forming surface 806 which can be shaped using cookie-cutter-like methods or other forming methods 804. Finally, the conductive slurry is allowed to harden and once hardened, is separated from the shaped forming surface 808.

Figure 9:
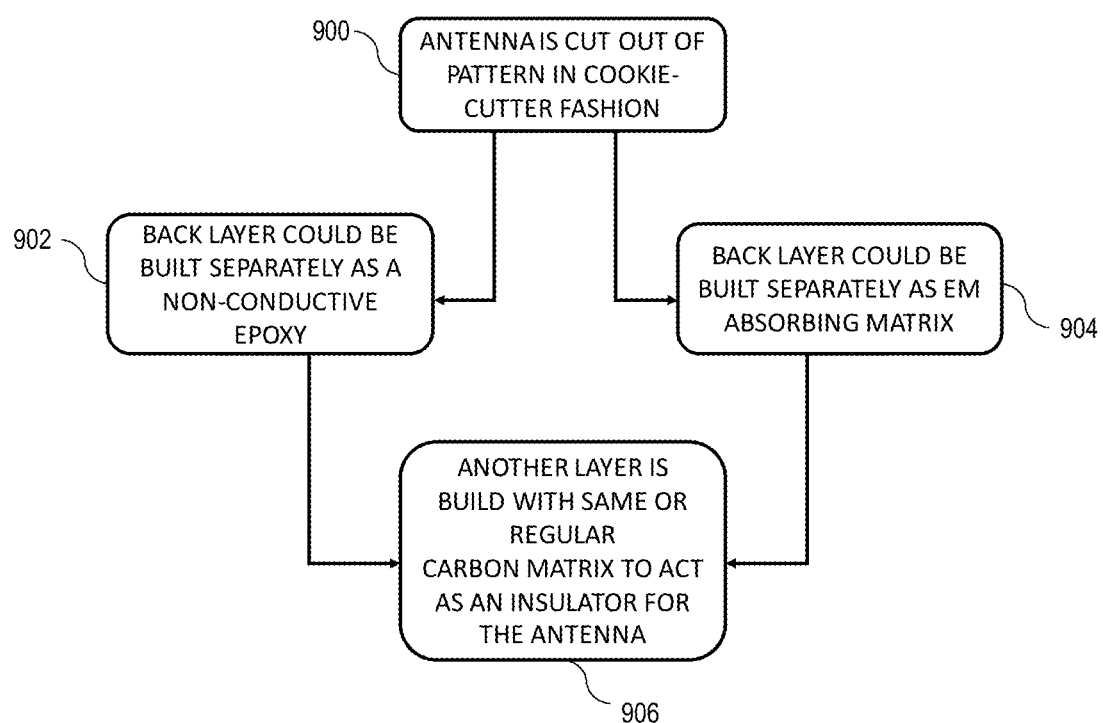
FIG. 9 is a flow diagram outlining the various ways the material is layered for the antenna.

FIG. 9 is a flow diagram outlining the various ways the material is layered for the antenna. In accordance with the preferred embodiment, the antennas are cut out of a predetermined design via cookie-cutter methods or other cutting methods 900. From this point, a back layer could be built separately from a non-conductive epoxy 902, or a back layer could be built separately as EM absorbing matrix 904. After the back layer is built in either method, another layer is built with the same or regular carbon matrix to act as an insulator for the antenna 906.

Figure 10:
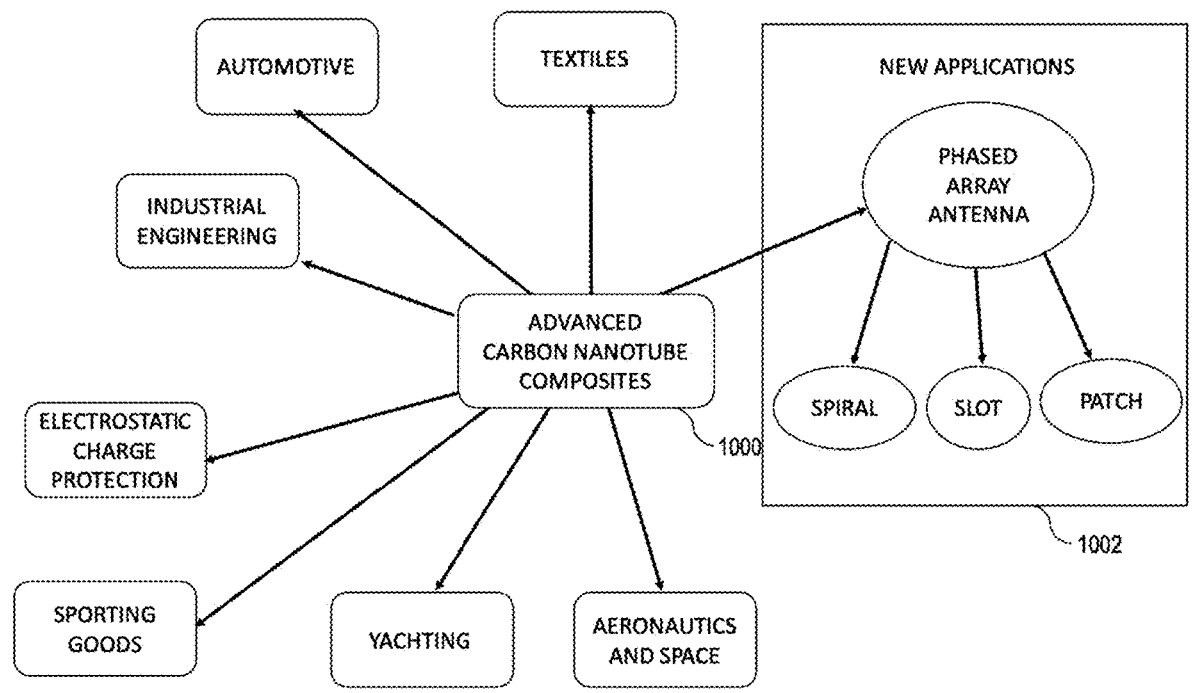
FIG. 10 is a diagram providing examples of previous use for the present invention compared with the new applications of this material's use for antenna production.

FIG. 10 is a diagram providing examples of previous use for the present invention compared with the new applications of this material's use for antenna production. In accordance with the preferred embodiment, the advanced carbon nanotube composites 1000 have previously been used in the development of textiles, automotives, industrial engineering projects, yachting, aeronautics and space, sporting goods, and electrostatic charge protection. In the present invention, advanced carbon nanotube composites are used in a new application 1002 of phased array antennas which can be patch spiral or slot antennas or other antenna shapes.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A phased array antenna having monolithic structure formed by a forming member wherein said phased array antenna includes:
   a carbon nanotube-based structure;
   carbon nanofiber for orienting along with said carbon nanotubes for enhancing said carbon nanotubes resonance;
   graphene-based powder for orienting along with said carbon nanotubes for enhancing said carbon nanotubes resonance and for providing increased physical strength of said phased array antenna;
   resin for adhering to said carbon nanotubes, said carbon nanofiber and said graphene-based powder for further forming said phased array antenna of uniform resonance without encapsulation of said forming member wherein said resin is locked into shape without encapsulation of said forming member; and
   wherein said phased array antenna is formed to be rigid for resonance, and wherein said phased array antenna is formed as a homogeneous member and wherein said homogeneous member extends to exposed surfaces of said phased array antenna, and wherein energy is resonated by said monolithic structure throughout its thickness.

2. The phased array antenna of claim 1 wherein said carbon nanofibers adhere to said carbon nanotubes and said graphene-based powder to form a monolithic structure of uniform resonance without encapsulation of said forming surface within said phased array antenna.

3. The phased array antenna of claim 1 wherein said monolithic structure is comprised of several concentrically interlinked carbon nanotubes.

4. The phased array antenna of claim 1 wherein said carbon nanotubes are formed as armchair carbon nanotubes.

5. The phased array antenna of claim 1 wherein said carbon nanotubes are formed as zigzag carbon nanotubes.

6. The phased array antenna of claim 1 wherein said carbon nanotubes are single walled.

7. The phased array antenna of claim 1 wherein said carbon nanotubes are multi-walled.

8. The phased array antenna of claim 1 wherein said phased array antenna is chemically bonded with a substrate.

9. A phased-array antenna having monolithic structure formed via a forming surface wherein said phased-array antenna is manufactured via a manufacturing process consisting of:
   manufacturing said forming surface according to a desired dimension for said phased-array antenna;
   mixing a slurry containing carbon nanotubes, carbon nanofibers, and a graphene-based powder, a resin and an associated hardener;
   applying and drying said slurry to said forming surface; and
   removing said dried slurry from said forming surface, wherein said slurry has dried to form a homogenous and monolithic structure.

10. A phased-array antenna having monolithic structure formed via a forming surface wherein said phased-array antenna is manufactured via a manufacturing process according to claim 9, wherein said forming surface is of a shape corresponding to a spiral antenna.

11. A phased-array antenna having monolithic structure formed via a forming surface wherein said phased-array antenna is manufactured via a manufacturing process according to claim 9, said forming surface is of a shape corresponding to a patch antenna.

12. A phased-array antenna having monolithic structure formed via a forming surface wherein said phased-array antenna is manufactured via a manufacturing process according to claim 9, wherein a medical device is formed from said slurry.

13. A phased-array antenna having monolithic structure formed via a forming surface wherein said phased-array antenna is manufactured via a manufacturing process according to claim 9, wherein non-carbon-based nanoparticles are used in place of said carbon nanotubes.

14. A phased-array antenna having monolithic structure formed via a forming surface wherein said phased-array antenna is manufactured via a manufacturing process according to claim 9, wherein electromagnetic waves are used to oscillate said carbon nanotubes into various forms.

15. A phased-array antenna having monolithic structure formed via a forming surface wherein said phased-array antenna is manufactured via a manufacturing process according to claim 9, wherein ultrasonics are used to oscillate said carbon nanotubes into various forms.

16. A phased-array antenna having monolithic structure formed via a forming surface wherein said phased-array antenna is manufactured via a manufacturing process of claim 9, wherein said forming surface is of a shape corresponding to a slot antenna.

17. A phased array antenna further formed from a slurry wherein said slurry is composed of carbon nanotubes and carbon nanofibers tuned to interact with electromagnetic signals and wherein said phased array antenna is formed to be fixed in shape for interacting with said electromagnetic signals, and wherein said phased array antenna is formed as a homogeneous member and wherein said homogeneous member extends to exposed surfaces of said phased array antenna.

18. The phased array antenna of claim 17 wherein said slurry further conducts and discharges said electromagnetic signals.

19. The phased array antenna of claim 17, wherein said slurry is composed of carbon nanotubes, carbon nanofibers, and graphene-based powder to form a uniformly dispersed resonant material without encapsulation of a forming surface within said phased array antenna.

* * * * *